US009291392B2

(12) United States Patent
Themann

(10) Patent No.: US 9,291,392 B2
(45) Date of Patent: Mar. 22, 2016

(54) TUNNEL DRYING DEVICE FOR BULK MATERIAL

(71) Applicant: BIG DUTCHMAN INTERNATIONAL GMBH, Vechta (DE)

(72) Inventor: Ludger Themann, Vechta (DE)

(73) Assignee: BIG DUTCHMAN INTERNATIONAL GMBH, Vechta (DE)

( * ) Notice: Subject to any disclaimer, the term of this patent is extended or adjusted under 35 U.S.C. 154(b) by 176 days.

(21) Appl. No.: 14/075,045

(22) Filed: Nov. 8, 2013

(65) Prior Publication Data

US 2014/0131169 A1 May 15, 2014

(30) Foreign Application Priority Data

Nov. 9, 2012 (DE) .................... 20 2012 010 693 U

(51) Int. Cl.
*B65G 45/12* (2006.01)
*F26B 15/18* (2006.01)
*F26B 17/08* (2006.01)

(52) U.S. Cl.
CPC ................ *F26B 15/18* (2013.01); *F26B 17/08* (2013.01)

(58) Field of Classification Search
CPC ...................................................... B65G 45/12
USPC ........... 198/435, 434, 525, 540, 550.01, 560, 198/550, 497, 494, 499, 823; 15/256.1, 15/256.5
See application file for complete search history.

(56) References Cited

U.S. PATENT DOCUMENTS

| | | | | |
|---|---|---|---|---|
| 1,568,791 | A | 1/1926 | Aiken | |
| 4,756,092 | A | 7/1988 | Anderson | |
| 5,222,589 | A * | 6/1993 | Gordon | 198/497 |
| 6,223,552 | B1 * | 5/2001 | Zimmerbauer et al. | 62/373 |
| 6,383,068 | B1 * | 5/2002 | Tollett et al. | 452/170 |
| 8,590,695 | B2 * | 11/2013 | Moreno Rueda | 198/734 |
| 2008/0251357 | A1 * | 10/2008 | Kawakami | 198/497 |

FOREIGN PATENT DOCUMENTS

| | | |
|---|---|---|
| DE | 311 480 | 3/1919 |
| DE | 759 118 | 3/1954 |
| DE | 40 36 112 C2 | 4/1994 |
| DE | 699 24 866 T2 | 3/2006 |
| EP | 2 003 412 | 11/2008 |
| GB | 856296 | 12/1960 |

* cited by examiner

*Primary Examiner* — Gene Crawford
*Assistant Examiner* — Lester Rushin
(74) *Attorney, Agent, or Firm* — Price Heneveld LLP

(57) ABSTRACT

A drying device for bulk material, comprises a conveyor on which a first majority of perforated plates with location surfaces for the bulk material is guided along a rail comprising an upper rail section, a lower rail section and a first deflection rail section at an end, in which the perforated plates are deflected from the upper into the lower rail section, and a second deflection rail section at an opposite end in which the perforated plates are deflected from the lower into the upper rail section. A scraper device comprises one or more scraping elements arranged so that the location surface of a perforated plate moving along the first or second deflection rail section comes into contact with the scraping elements, and is cleaned by means of a relative movement between the scraping elements and the perforated plate.

16 Claims, 5 Drawing Sheets

TUNNEL DRYING DEVICE FOR BULK MATERIAL

CROSS REFERENCE TO FOREIGN PRIORITY APPLICATION

The present application claims the benefit under 35 U.S.C. §119(b) of German Application No. 20 2012 010 693.7, filed Nov. 9, 2012, entitled "Tunnel Drying Device for Bulk Material."

FIELD OF THE INVENTION

The invention relates to a drying device for bulk material comprising an upper guiding means, on which a first majority of perforated plates with location surfaces for the bulk material is guided along a rail comprising an upper rail section, a lower rail section and a first deflection rail section at the end, in which the perforated plates are deflected from the upper into the lower rail section on a first side, and a second deflection rail section at the end in which the perforated plates are deflected from the lower into the upper rail section on a second side of the drying device lying opposite the first.

In particular, the invention relates to drying devices designed to dry moist bulk material and bulk material that tends to stick. This type of drying requirement typically and often occurs in agricultural businesses, for example if moisture is to be withdrawn from excreta from livestock prior to its further processing or use, or if fragmented plant material is to be dried.

BACKGROUND OF THE INVENTION

It is known to use a drying device designed as a drying tunnel for such drying. With such a drying device, the bulk material is transported on a surface in a horizontal direction and surrounded by an airflow that draws moisture from the bulk material. The surface on which the bulk material is transported, can, for example, be a conveyor belt, or can be formed by several plates that adjoin each other and are arranged adjacent to one another thus forming a conveying surface. The conveyor belt and the plates can be perforated with holes, slots or other openings to allow the air flow to better access the bulk material and to flow through the bulk material. This can help to accelerate the drying with certain types of bulk material.

These types of drying devices are typically operated in a continuous process. The moist bulk material is thereby deposited on the plates at a loading site, the plates are continuously moved on an enclosed rail within the drying device, and the dried bulk material is removed from this rail at an extraction site, preferably by tipping the plates in conjunction with the respective effect of gravity on the bulk material. It is known to design drying devices in a way that they comprise two or more drying levels. The bulk material is typically led to the first upper level, transported on this level through a drying tunnel, whereby moisture is drawn from the bulk material during this transportation, and finally delivered by gravitational force at an end of the drying tunnel to a lower level. The bulk material is again led through the drying tunnel on said lower level, whereby the conveying direction is opposed to the preceding conveying direction on the upper level, and more moisture is drawn from the bulk material. After passing through the drying tunnel on the lower level, the bulk material can be loaded to a further, deeper third level, and once again pass through the drying tunnel on this third level for moisture withdrawal. In this manner, according to the type of drying tunnel, two, three, four or even more levels, preferably an even number of levels, can be provided, on which the bulk material passes through the drying tunnel in a reciprocating transport movement, thereby increasingly losing moisture, so as to be then loaded from the lowest level into a collection point, from which the dried bulk material is removed by appropriate means, for example an auger, and used for backfill or other further processing.

It is generally known to provide the several levels on which the bulk material is transported in one single continuous conveyor belt, which is accordingly deflected in deflecting devices at the end. Alternatively, it is also known to provide the several levels by means of respectively several separate continuous transportation devices, which, for example, consist of an upper and a lower run and are each deflected at the end by 180°.

With said drying devices that are known, for example, from EP2003412A1 according to the design of a drying tunnel, efficient drying of bulk material is achieved in many applications. The drying performance can be set by adjusting the length of the drying tunnel, the number of drying levels, and the volume of the air flow rate of the drying air, as well as the temperature and the humidity of this drying air, so as to achieve a high drying performance. However, there is a demand for drying devices that are able to dry moist bulk material in an economically more efficient manner than known drying devices.

Said demand according to the invention is fulfilled by proposing a drying device with the design described above, in which a scraper device is arranged in the area of the first or second deflection rail section, which comprises one or more scraping elements that are arranged in such a way that the location surface of a perforated plate moving along the first or second deflection rail section comes into contact with the scraping elements and is cleaned by means of a relative movement between the scraping elements and the perforated plate.

The invention is based on the findings that an increase in the efficiency of the drying effect can be achieved with unchanged use of energy and dimensions of the drying device if the location surfaces of the plates of a drying device, on which the bulk material is transported within the drying device, can be effectively cleaned after passing through an upper rail section by providing one or several scraping elements, which perform a relative movement to the plates. Said relative movement can in particular be provided by guiding the plates along the scraping elements, preferably on the path of these plates along the deflection rail section. The cleaning of the location surface obtained in this way ensures that bulk material parts sticking to the location surface are effectively removed, thus preventing the formation of a layer on this location surface. In this way, the bulk material that reaches the location surface can always come into direct contact with the plate, and the heat conduction from the plate to the bulk material can be constantly maintained at a high level, which further increases the drying effect. In addition, if perforated plates are being used, bulk material which has accumulated in the openings in the plates, i.e. the perforations, can be removed by means of the relative movement between the scraping elements and the bulk material of the plates, thus preventing blockage of these openings. In this way, an airflow passing through the perforations that is beneficial to an effective and efficient drying can be maintained and ensured during operation for practically all perforations, which increases the drying efficiency.

The invention has the special feature that the scraper device is arranged in the deflection rail section, which achieves the advantage that the plates can be cleaned with the scraper device if there is no bulk material on them. This feature is provided according to the invention, although the plates do not typically move in the deflection rail section in a horizontal movement path, but are instead deflected, and can therefore not be easily cleaned in a process that requires mechanical contact.

SUMMARY OF THE INVENTION

According to the invention, a scraper device can be provided in the first deflection rail section. Alternatively, a scraper device can also be provided in the second deflection rail section, and furthermore, two scraper devices can be provided respectively in both the first as well as the second deflection rail section. The arrangement and number of scraper devices depends in particular on the adhesion properties of the bulk material that is to be dried, and on whether or not these adhesion properties were already considerably reduced as a result of the drying of the bulk material after it had passed through the first deflection rail section. According to the invention, an especially preferred embodiment consists in that the drying device has only one single scraper device, which cleans the plates in the first deflection rail section. This embodiment causes an efficient cleaning of the plates, in particular after passing through the first rail section with fresh, applied bulk material, which regularly has a particularly high adhesion due to its high moisture. Plates on which the bulk material is subsequently dried further regularly tend to be less contaminated, since the bulk material was already dried in a relevant way, so that the efficiency of the drying device can be optimized when only the plates loaded with fresh bulk material are cleaned after passing through the upper rail section.

According to a first preferred embodiment, it is provided that the perforated plates of the first majority of perforated plates are connected with each other or with a carrier means in such a way that they form a conveying surface. Said connection of the perforated plates with each other or with a carrier means ensures that the perforated plates are arranged adjacent to one another and can be jointly conveyed so as to form a continuous conveying surface on which the bulk material is stored, transported and dried. In this context, it has to be understood that a continuous conveying surface within the meaning of said further embodiment can also be understood as a surface composed of several individual surfaces with gaps or crevices in between. The individual plates can be connected in such a way that they are loosely arranged adjacent to and pushing each other thus transferring pressure forces from one plate to the other plate, for example, if the plates are mounted on a rail system on rollers or sliding bearings and are pressed through said rail system by the according driving force. The plates can also be connected in such a way that traction as well as pressure forces can be transferred between the plates, so as to jointly provide driving force for the plates from the traction side. Furthermore, the plates can be connected to each other in a way that they do not adjoin and push each other nor in a way that allows for a transfer of traction forces, however, each plate can be connected individually with a carrier means, for example a chain, a belt or a carrier frame, which is driven by a central drive unit thus transferring the driving force to each individual plate synchronously. The connection between the plates or to the carrier device can be rigid or flexible, for example articulated, and it can furthermore be non-detachable or detachable, for example to separate the plates in the area of the deflection rail sections from each other or from the carrier device in order to deflect the plates and transport the bulk material to a lower level in an effective manner.

According to another preferred embodiment, it is provided that the scraping elements are guided flexibly relative to the upper guiding means. Such flexibility of the scraping elements or the individual scraping element relative to the upper guiding means makes it possible for the scraping element to adapt to a movement of the plates, thus allowing for cleaning by means of the relative conveying movement of the plates along the scraping element even in tight spaces in the area of the deflection rail section. It is particularly beneficial that, due to the flexibility, a high contact pressure between the scraping element and the location surface of the plate is achieved without it being necessary that the movement of the scraping element is controlled in an elaborate way or that the plate is led on an exact track on which a spatially fixed tangent with regard to the guiding means is kinematically ensured. In addition, the relative movement between scraping element and guiding means can prevent the scraping element, guiding means or plates from being damaged if there are highly adhesive bulk material portions on the location surface that cannot be removed by the scraping element, since in this case the scraping element can perform an evasive movement and no mechanical blockage occurs.

Furthermore, it is preferred that the scraper device comprises a pivot bearing on which the scraping elements are mounted pivotably around a pivot axis relative to the upper guiding means. The scraping element can be advantageously guided by means of said pivot bearing by achieving a contact pressure of the scraping element on the location surface by means of weight or spring force along an immovable contact line or a contact line that changes according to the relative movement, and at the same time, a robust guide of the scraping element can be mechanically realized which allows for the scraping element to avoid irremovable adhesives on the location surface on a circular path, which preferably has a movement component running in the direction of the movement of the perforated plates along the deflection rail section to avoid blockage due to such adhesives or other uneven features.

For this, it is particularly preferred that the pivot axis is positioned coaxially to a deflection axis of a deflection roll on which the perforated plates are deflected. Said coaxial arrangement of the pivot axis and deflection axis of a deflection roll of the perforated plates usually results in a very favorable kinematics, on the one hand, for the contact lines or the contact area between the scraping element and the location surfaces, and on the other hand, for a movement of the scraping element subsequent to a movement of the plate along the deflection rail section as well as an evasive movement of the scraping element in the case of unevennesses or irremovable adhesives.

According to another preferred embodiment, it is provided that the scraping element is an elastic scraping lip, preferably a rubber-elastic scraping lip. Basically, the scraping element can be designed according to the invention to form a single, continuous contact line or contact area to the location surface of the plates and to cause cleaning in the area of said line or area by means of a shearing scraping movement. In order to compensate for unevennesses of the plate, which can occur during operation, or irremovable adhesives, it is advantageous if the scraping element shows an elasticity, in particular a reversible elasticity, so as to avoid the lifting of the entire scraping element by said unevennesses or adhesives thus canceling the cleaning effect as a result of the no longer existing contact line or contact area. The invention also comprises embodiments with several scraping elements, for example of such nature that said scraping elements are arranged adjacent to one another along a line, and that this line extends perpendicular to the relative movement between the plates and the scraping elements. Alternatively, several scraping elements can also be arranged staggered behind one another in the direction of the relative movement between the plate and scraping elements, in order to form several contact lines which are spaced apart from one another and to improve the cleaning effect. In particular, different scraping elements can also be used, for example scraping elements with different degrees of elasticity, in order to separate large, strongly adhering deposits, but also small, loosely adhering bulk material portions in a reliable manner.

Furthermore, it is preferred that the scraping element is in contact with the perforated plates in an area in which the location surfaces of the perforated plates are inclined to the horizontal, preferably at an angle of more than 45° to the horizontal, and in particular arranged almost perpendicularly. Said arrangement of the scraping element with regard to the perforated plates results in the fact that the bulk material portions separated by the scraping element from the location surfaces of the plates do not remain on the plates, but slide from the location surface and cannot adhere again. It is particularly preferred that the contact between the scraping element and the location surface of the perforated plates is positioned in an area adjacent to, and in particular above the area in which the bulk material has slid down from the plates as a result of pivoting the plates, in order to ensure that the bulk material portions that were separated by the scraping element can also follow the same falling path and then undergo the further drying process.

Furthermore, it is preferred that the first or the second deflection rail section runs in the area of a first or a second deflection means comprising a first upper and second central deflection wheel, which deflects the plates upwards from a first horizontal movement direction to the first upper deflection wheel, and a third lower deflection wheel, to which the plates are deflected by the first upper deflection wheel and which deflects the plates in a second horizontal movement direction that is opposed to the first horizontal movement direction. Said type of deflection in the area of the first or the second deflection rail section deflects and moves the plates in such a way that achieves a deflection of the plates by 180° in total and provides a rail section in which adhesives can be effectively scraped. Said rail section can in particular have a vertical movement component or be aligned exactly vertically which results in the fact that the bulk material portions that were separated by the scraping element can easily slip off the location surfaces of the plates, and do not adhere again. It is to be understood that in said embodiment, the first deflection wheel can also be formed of two coaxially mounted deflection rolls, deflection wheels, toothed deflection pulleys or the like that are spaced apart from one another; the same can be embodied accordingly for the second and third deflection wheel. Instead of the deflection wheels, guiding means such as rails or the like can be provided accordingly.

Furthermore, it is particularly preferred that the scraping element is pivotably mounted around the rotation axis of the central deflection wheel. With the above described embodiment, the plates can be guided in particular on the rail section between the second central deflection wheel and the first upper deflection wheel on a vertically upward facing movement path on which the location surfaces of the plates point in the direction of the rotation axis of the second central deflection wheel. Said rail section is particularly well suited to perform the cleaning process by means of the scraping element, whereby the scraping element preferably is mounted pivotably around the rotation axis of the central deflection wheel, i.e. to have the pivot axis of the scraper device and the rotation axis of the central deflection wheel run coaxially relative to one another. The scraping element can preferably extend or be arranged in such a way that the contact area between the scraping element and the location surfaces of the plates is positioned above the pivot axis of the scraping element, which achieves a reliable pressing of the scraping element on the location surfaces, and at the same time an evasive movement of the scraping element with regard to immovable adhesives.

Furthermore, it is preferred that the first majority of perforated plates is guided along the upper and lower rail section with an almost horizontal orientation of the location surfaces, and pivoted within the area of the first deflection section from said horizontal orientation in at least a part of the deflection rail section. The first majority of perforated plates is guided by the upper guiding means along the rail sections and the deflection rail sections on a continuous web. On said continuous web, the direction is reversed at least twice in the deflection sections. According to this embodiment, the plates are pivoted in said deflection sections to a horizontal orientation. Said pivoting can be realized in such a way that the plates essentially maintain their conjoined and directly adjacent arrangement, and only their angular position to one another is changed. Preferably, pivoting can also be realized in such a way that each plate is pivoted around a pivot axis and a larger gap is thereby formed between neighboring plates through which the bulk material that was stored on the supporting surface of the pivoted plate can fall down. Said pivoting from a horizontal position allows for the bulk material to pass from the upper rail section to plates in the lower rail section, thus achieving a back and forth transport of the bulk material on the upper and lower rail section. Furthermore, the pivoting and dumping of the bulk material due to gravity results in the bulk material being mixed and loosened, thus improving the effect and homogeneity of the drying process. Finally, the pivoting brings each plate in at least a part of the deflection rail section in an orientation that facilitates an efficient cleaning by means of the scraper device, whereby scraped bulk material remains can slip off the plate and fall down. In this preferred embodiment, the perforated plates that are arranged below the section and aligned horizontally can also be part of the first majority of perforated plates or of another majority of perforated plates, for example a circuit of perforated plates running independently from the first circuit below said first circuit.

It is particularly preferred in this embodiment that the perforated plates arranged below the part of the deflection rail section are part of the first majority of perforated plates. This embodiment ensures that, by pivoting and conveying the bulk material from the upper rail section to the lower rail section, the bulk material is efficiently dried in a back and forth movement on the upper run and the lower run of a conveying circuit formed by the plates, and thereby a mixing, loosening and drying is caused in the first deflection section by pivoting each plate that enters the deflection rail section from the upper rail section.

According to another preferred embodiment, the drying device according to the invention is formed by a lower guiding means, on which a second majority of perforated plates is guided along a lower rail comprising an upper rail section, a lower rail section and a first deflection rail section at the end, in which the perforated plates are deflected from the upper into the lower rail section on a first side, and a second deflection rail section at the end in which the perforated plates are deflected from the lower into the upper rail section on a second side of the drying device lying opposite the first, whereby the lower rail runs below the first deflection section of the upper guiding means in such a way that the bulk material, which in the first deflection section slips off the location surface of a perforated plate as this is tilted, falls down onto a perforated plate on the lower rail.

This further embodiment form provides a drying device with several drying levels in which two groups of perforated plates are guided in two closed circuits accordingly, and the bulk material thus falls from an upper circuit along the upper guiding means sequentially into the lower circuit.

In particular, it can be provided that the bulk material, after passing through the upper and lower rail sections of the upper circuit along the upper guiding means, falls down onto the perforated plates of the second majority of perforated plates by pivoting the plates in the second deflection rail section of the upper guiding means, where it is guided horizontally again along an upper and subsequently a lower rail and dried, and, by pivoting the perforated plates of the second majority, is subsequently also discharged from this lower circuit. After the bulk material has been discharged from the lower circuit, it can be removed from the drying device by a collecting device, or as the case may be, the drying device can also be further formed by a third, a fourth and further circuits of perforated plates in order to cause further drying. In principle, it has to be understood that the provision of four, six or more horizontal rail sections can be formed in a vertically staggered manner by correspondingly one, two, three or even more separate and enclosed continuous conveyor belts with a corresponding majority of perforated plates. In other embodiments, this number of 2, 4, 6 or more levels can be provided in the form of a single, enclosed continuous conveying circuit of perforated plates with several deflections in corresponding deflection rail sections.

Basically, a drying device comprising 4 or even more horizontal rail sections can be driven in such a way that the bulk material is dried in parallel, i.e. the bulk material is freshly applied to two or several upper rail sections, subsequently passes through an upper and a lower rail section respectively, and is then discharged again in dried form. It is however particularly preferred, if, according to the aforementioned embodiment, the bulk material sequentially, that is, consecutively passes through four or more horizontal rail sections, i.e. the bulk material is freshly applied to an upper horizontal rail section, passes through this upper horizontal rail section, and subsequently passes through a lower rail section below, which is formed by the same perforated plates that also form the upper horizontal rail section. Subsequently, the bulk material falls from the lower rail section of the first majority of perforated plates to an upper rail section of a second majority of perforated plates, which in turn form a continuous conveying circuit. After passing through the upper rail section of said second majority of perforated plates, the bulk material falls onto a lower rail section of this second majority of perforated plates, and is discharged after having passed through said lower rail section, or is led to an upper rail section of a third majority of perforated plates in a similar fashion in order to undergo drying once again along two horizontal rail sections.

Furthermore, a method for drying bulk material is comprised including the following steps: transporting the bulk material by means of a majority of perforated plates with location surfaces for the bulk material along a rail along an upper rail section and a lower rail section; dumping the bulk material in a first deflection rail section at the end from the upper to the lower rail section, which is characterized by the step: cleaning the perforated plates in the area of the first deflection rail section by means of a scraper device comprising one or several scraping elements that are arranged in such a way that the location surface of a perforated plate moving along the first deflection rail section comes into contact with the scraping element(s), and is cleaned by means of the relative movement between the scraping element(s) and the perforated plate.

Said procedure ensures a particularly effective drying of bulk material, since the plates are regularly cleaned, which prevents the adhesion and formation of bulk material on the surfaces of the plates as well as the blocking of the perforations of the plates, thus causing an improved heat transfer from the plates to the bulk material and a better ventilation of the bulk material on the plates.

For this, it is preferred that the cleaning is performed by means of scraping elements positioned flexibly with regard to a guiding of the perforated plates, in particular by scraping elements that are positioned pivotably.

Furthermore, it is preferred that the perforated plates are at least partly pivoted in the deflection rail sections, in particular in the area in which the cleaning takes place, in order to achieve the dumping of bulk material to a lower rail section, but also to facilitate efficient cleaning due to the slipping of the separated bulk material remains.

The method can be implemented in particular with the above described drying device and embodied in the above described manner. With regard to the preferred embodiments of the method, reference is made to the above described preferred processes of the individual embodiments of the drying device.

BRIEF DESCRIPTION OF THE DRAWINGS

A preferred embodiment of the invention is explained in more detail through the attached figures. The following is shown in.

DETAILED DESCRIPTION OF THE PREFERRED EMBODIMENTS

Figure 1:
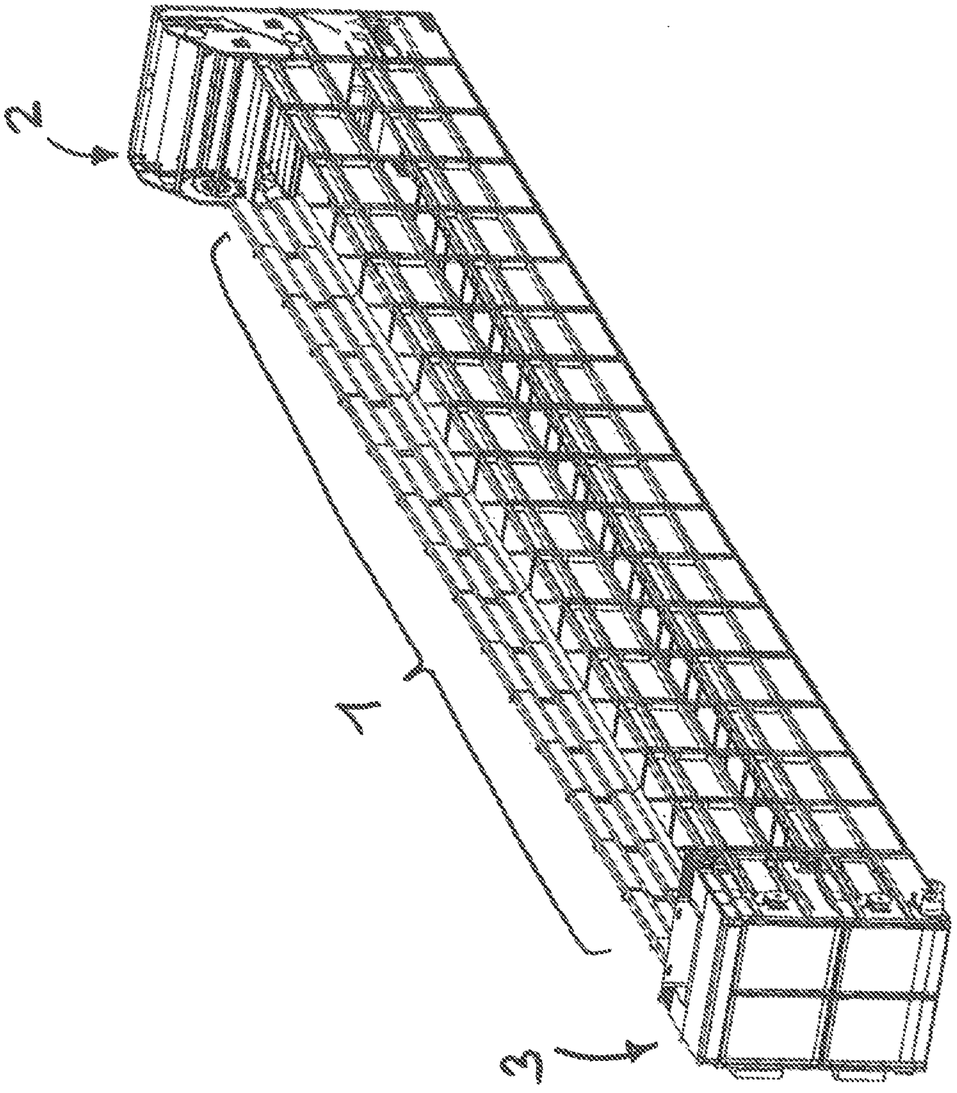
FIG. 1 is a drying device according to the invention in a perspective view diagonally from above.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
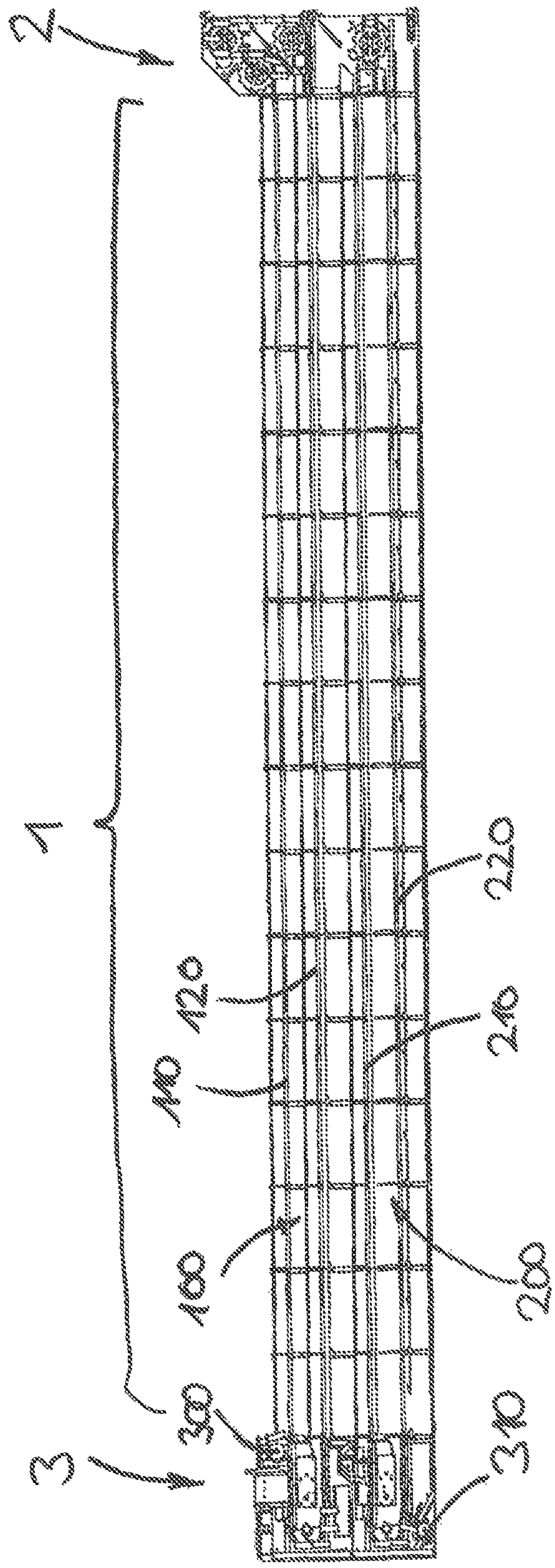
FIG. 2 is a median lateral side view of the drying device according to FIG. 1.

Referencing first FIGS. 1 and 2, a drying device according to the preferred embodiment comprises a drying tunnel 1 that is stretched lengthwise, which has a right deflection section 2 at one end and a left deflection section 3 lying opposite it. An upper continuous conveyor belt 100 and a lower continuous conveyor belt 200 below it, with respectively an upper and a lower horizontal rail section 110, 120, 210, 220, are staggered vertically in drying tunnel 1. Said upper and lower continuous conveyor belts 100, 200 are deflected in the deflection sections 2, 3 at the end, by 180° respectively.

Moist bulk material is applied in the second deflection section 3 to the upper rail section 110 of the upper continuous conveyor belt by an upper loading screw 300. Furthermore, dried bulk material, which has been conveyed from the lower rail section 220 of the lower continuous conveyor belt to a collection point, is discharged into the second deflection section 3 by means of a lower discharge screw 310.

The drying device has ventilation and exhaust apertures in the area of drying tunnel 1 through which heated and preferably dry air can be led into the drying tunnel and correspondingly moist exhaust air can be led out of the drying tunnel. The drying tunnel is ventilated by forced convection. Temperature, humidity content and airflow volume of said drying air are essential parameters for the drying performance of the drying device.

Figure 3:
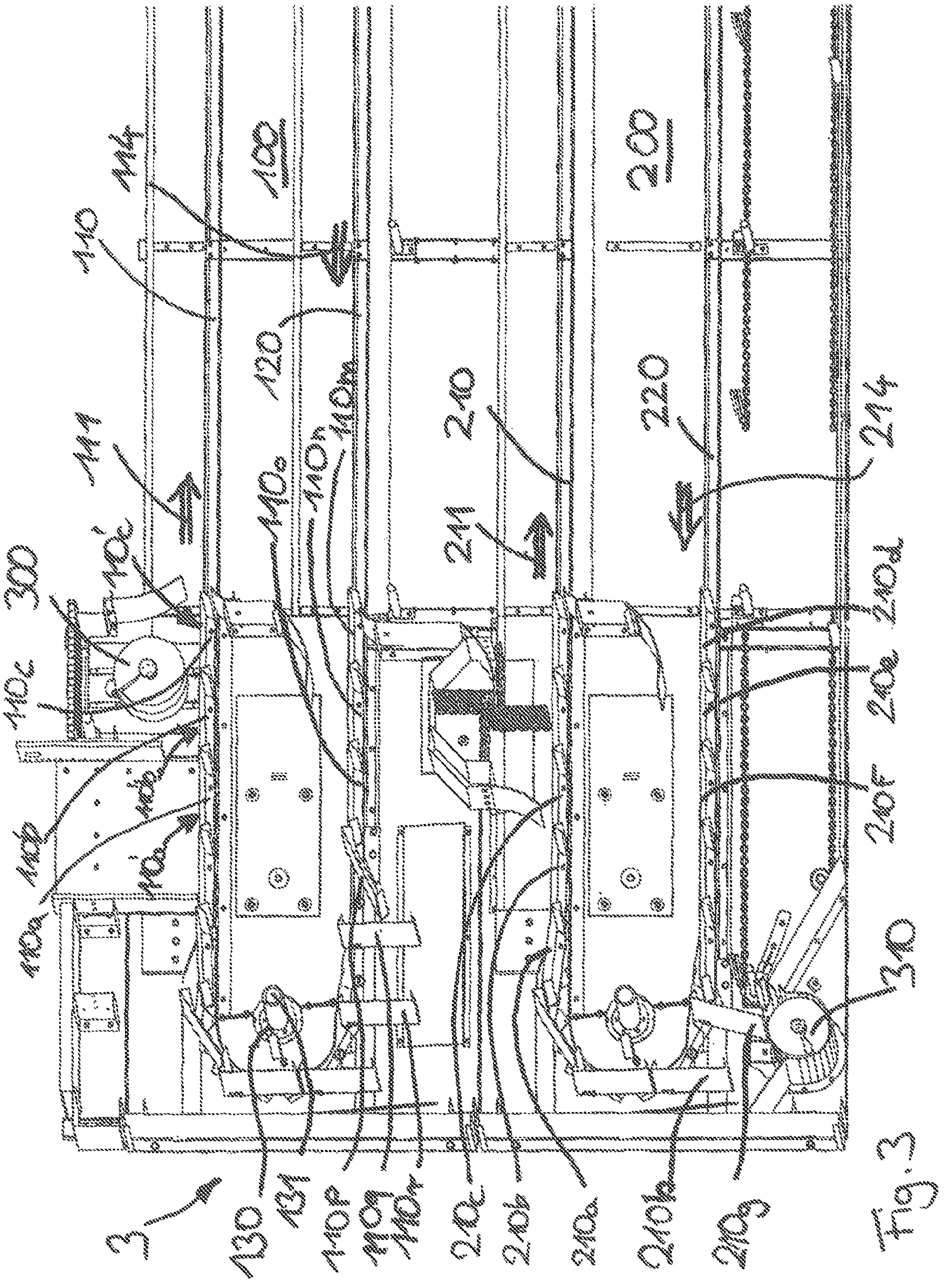
FIG. 3 is an enlarged view of the left deflection area of the drying device according to FIG. 2.

In FIG. 3, the second deflection section 3 with loading screw 300 is shown in greater detail.

Loading screw 300 conveys bulk material horizontally to perforated plates 110*a*, 110*b*, 110*c* which are guided under the charge screw 300 in a horizontal orientation. Said perforated plates 110*a*, 110*b*, 110*c* move in the direction of arrow 111 into the upper horizontal rail section 110 into drying tunnel 1. The bulk material is dried by blowing warm and dry supply air from below through the perforations of plates 110*a*, 110*b*, 110*c*. Plates 110*a*, 110*b*, 110*c* move along the upper rail section 110 with a horizontal orientation of their location surfaces 110'*a*, 110'*b*, 110'*c* through drying tunnel 1 in the direction of arrow 112 to the first deflection rail section in the first deflection unit 2 at the end.

In said first deflection unit 2, the plates are deflected by 180°, which is further described below. Following said deflection, perforated plates 110*a*, 110*b*, 110*c* pass through the lower rail section 120 of the upper continuous conveyor belt, thereby re-transporting the bulk material, which is further dried when passing through drying tunnel 1 as dry air passes through the perforations in the plates. The perforated plates then arrive in the direction of arrow 114 as perforated plates 110*m*, 110*n*, 110*o* at the second deflection section 3. There, they are pivoted from their horizontal position into a vertical position by pivoting around a pivot axis that is located at the back end of the perforated plates in the conveying direction, which is evident with plates 110*p*, 110*q*, 110*r*. The bulk material located on said perforated plates then falls down to the horizontally arranged perforated plates 210*a*, 210*b*, 210*c* of the lower continuous conveyor belt 200.

The perforated plates of the upper continuous conveyor belt 100 that were pivoted in this way are then deflected by means of a deflection wheel 130 around a deflection axis 131 by 180°, thereby pivoting back into a horizontal position, and are then fed again into the area below charge screw 300 in order to be reloaded with moist bulk material.

Perforated plates 210*a*, 210*b*, 210*c* then leave the second deflection section in the direction of arrow 211 and are guided along an upper rail section 210 with a horizontal orientation of their location surfaces through drying tunnel 1. Here, the bulk material located on said perforated plates 210*a*, 210*b*, 210*c* is further dried. After having entered the first deflection section 2, the perforated plates 210*a*, 210*b*, 210*c* are deflected on a deflection rail section by 180° and brought into a horizontal position, and the bulk material is hereby brought from the upper horizontal rail section to a lower horizontal rail section 220 by gravity. The plates pass along the lower horizontal rail section 220 through drying tunnel 1, whereby the bulk material passes through the drying tunnel for the last time so as to be further dried. The bulk material again arrives at the second deflection section 3 in the direction of arrow 214 on the perforated plates 210*d*, 210*e*, 210*f*. Here, the perforated plates 210*d*, 210*e*, 210*f* are deflected by 180° in a deflection rail section. As demonstrated, the perforated plates pivot, as shown with plates 210*g*, 210*h*, from a horizontal orientation to a vertical orientation, whereby the bulk material falls down and can be discharged from the drying device through discharge screw 310.

Figure 4:
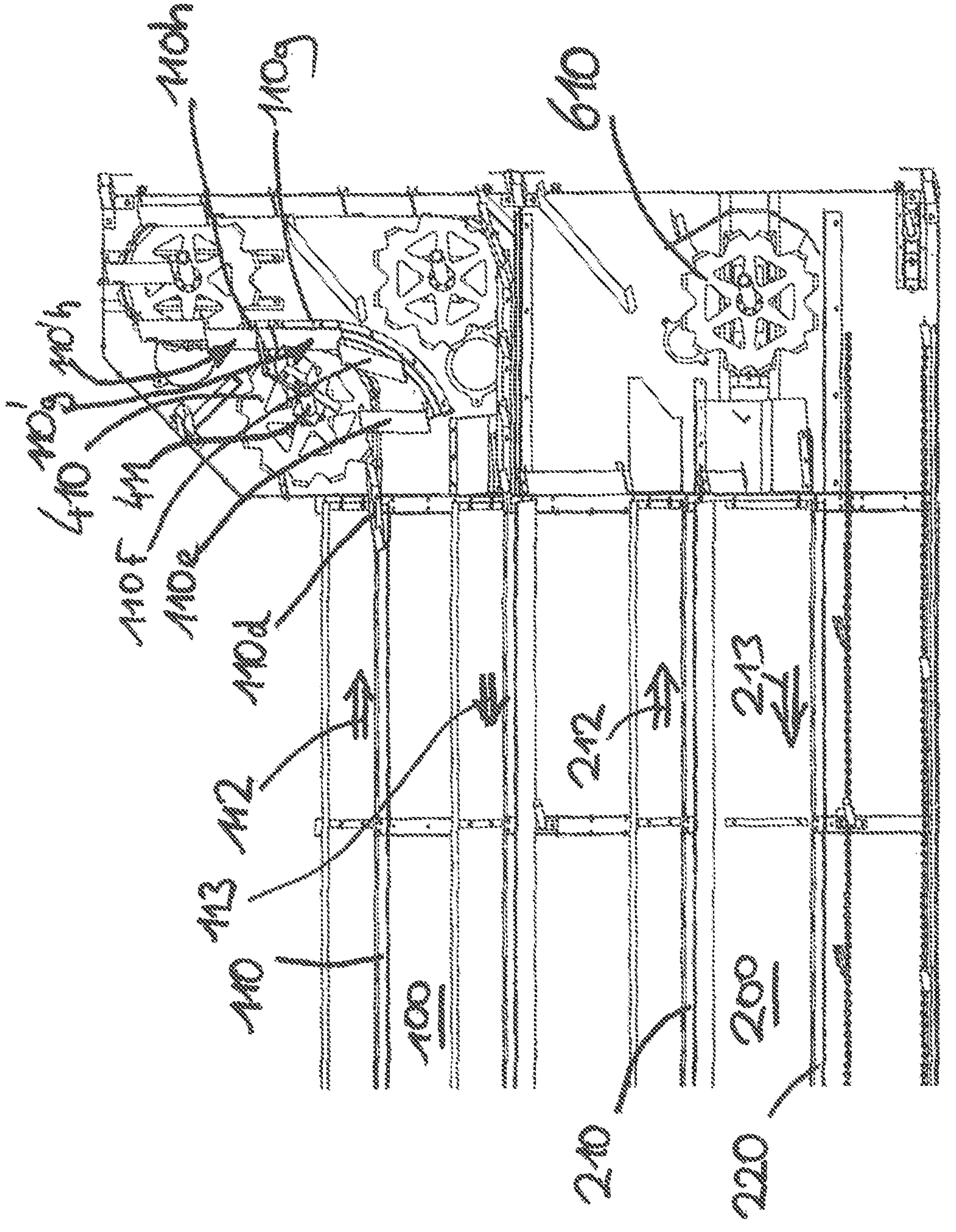
FIG. 4 is an enlarged view of the right deflection area of the drying device according to FIG. 2.
Figure 5:
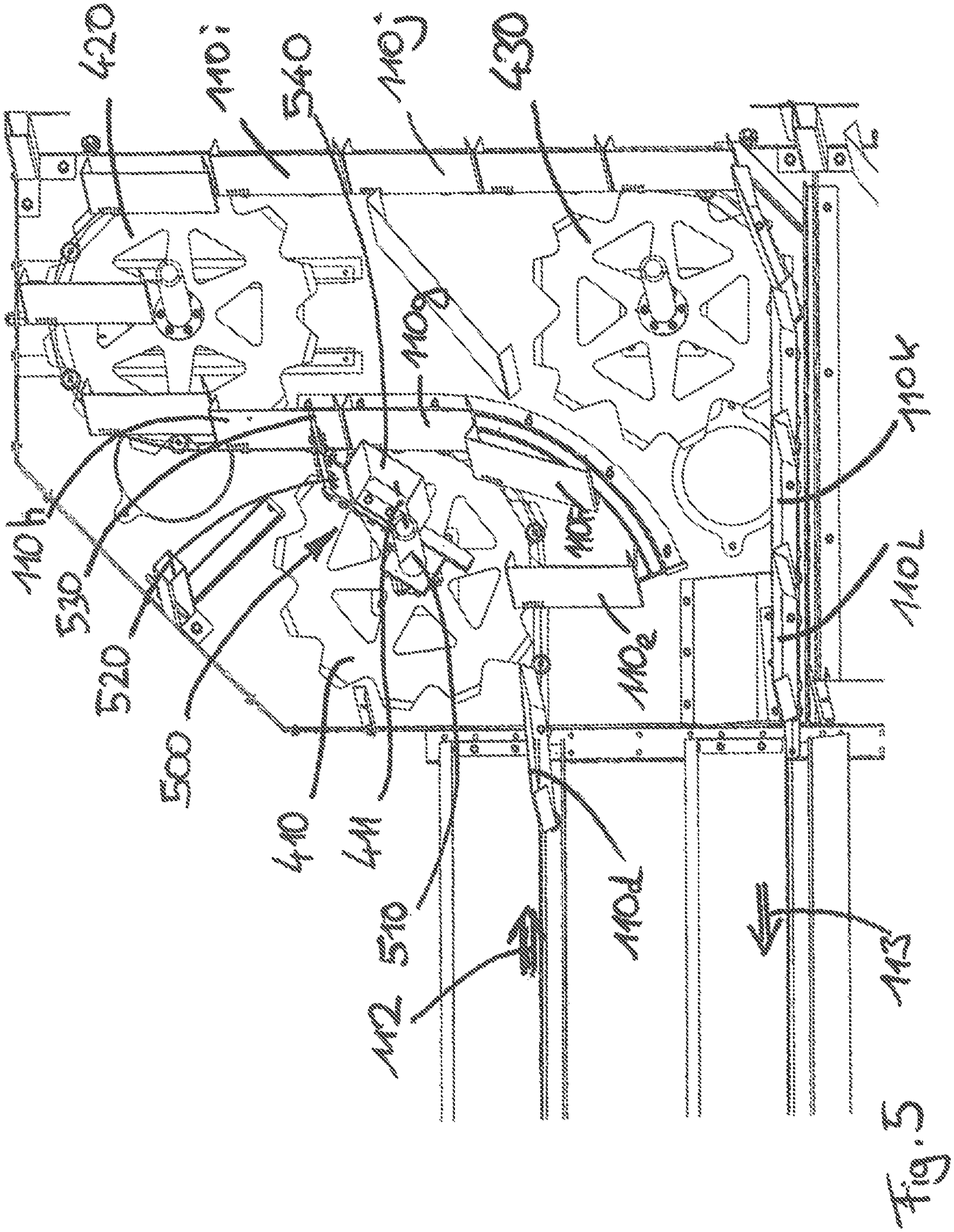
FIG. 5 is an enlarged view of the upper section of the right deflection area according to FIG. 4.

Referencing FIGS. 4 and 5, it can be seen that the perforated plates 110*a*, 110*b*, 110*c*, move from the upper rail section 110 of the upper continuous conveyor belt to the first deflection section 2 and enter it as perforated plates 110*d*, 110*e*, 110*f*, thereby being pivoted into a vertical orientation. Said pivoting is done by pivoting the perforated plates around a pivot axis that is located at the front on the perforated plates in conveying direction thereby causing the back end to tilt down. The bulk material, which was stored on the supporting surfaces of the perforated plates, then falls down from the plates and reaches the supporting surface of perforated plates 1101, 110*m*, 110*n*, which enter the lower horizontal rail section 120 of the upper continuous conveyor belt 100 in the direction of arrow 113 into drying tunnel 1.

After or partly during the pivoting of perforated plates 110*d*, 110*e*, 110*f*, said plates are guided vertically upwards on a deflection rail section by deflection wheel 410. Here, supporting surfaces 110'*g*, 110'*h* of perforated plates 110*g*, 110*h* face in the direction of rotational axis 411 of deflection wheel 410.

A scraper device 500 is pivotably and coaxially mounted around pivot axis 411 of deflection wheel 410. Scraper device 500 has a pivot bearing pipe 510 that is designed as a hollow shaft and pivotably mounted on an axis by means of a pivot bearing. A scraping arm 520 extends obliquely upwards from pivot bearing pipe 510. At the end of said scraping arm 530, a rubber-elastic scraping lip 520 is removably mounted, which can be replaced if required due to wear and which forms a contact line to supporting surfaces 110'*h* in the area of perforated plate 110*h*.

Rubber-elastic lip 530 of scraper device 500 is pressed by the lever-controlled weight force of weight 540 on to the supporting surfaces of the perforated plates, which are carried past the scraper device in their vertical upwards movement. Thus, rubber-elastic lip 530 scrapes adhesive bulk material from said supporting surfaces of the perforated plates. After having been scraped, the bulk material falls down onto perforated plates 110*k*, 1101.

After the perforated plates have been cleaned this way by scraper device 500, they are deflected downwards by 180° by an upper deflection wheel 420, then run vertically downwards as perforated plates 110*i*, 110*j*, and are then deflected by 90° by a lower deflection wheel 430 thus regaining a horizontal orientation. After deflection by the deflection wheel 430, the supporting surfaces of perforated plates 110*k*, 110*l* are loaded with the bulk material as it falls down from above and run in the direction of arrow 113 into the lower horizontal rail section of drying tunnel 1.

It can be inferred from FIG. 4 that the perforated plates of the lower continuous conveyor belt 200 are guided from the upper horizontal rail section 210 in the direction of arrow 212 to a deflection wheel 610, are then deflected by said deflection wheel 610 by 180° and then once again enter the lower horizontal rail section 220 of the lower continuous conveyor belt in the direction of arrow 213 into drying tunnel 1.

Here, in the first deflection section 2, the bulk material is transferred from the upper rail section 110 to the lower rail section 120 of the upper continuous conveyor belt 100 on the one hand, and from upper rail section 210 to the lower horizontal rail section 220 of the lower continuous conveyor belt 200 on the other hand, however, the bulk material is not transferred from the upper continuous conveyor belt 100 to the lower continuous conveyor belt 200. In the second deflection section 3, there is a transfer from the lower rail section 120 of the upper conveyor to the upper rail section 210 of the lower conveyor 200.

It is to be understood that variations and modifications can be made on the aforementioned structure and method without departing from the concepts of the present invention, and further it is to be understood that such concepts are intended to be covered by the following claims unless these claims by their language expressly state otherwise.

The invention claimed is:

1. A drying device for bulk material, comprising:

a first conveyor on which a first majority of perforated plates with location surfaces for the bulk material is guided along a rail comprising an upper rail section, a lower rail section and a first deflection rail section at the end, in which the perforated plates are deflected from the upper into the lower rail section, and a second deflection rail section at an opposite end in which the perforated plates are deflected from the lower rail section into the upper rail section; and a scraper device arranged proximate the first or second deflection rail section comprising a scraping element that is arranged in such a way that the location surface of a perforated plate moving along the first or second deflection rail section comes into contact with the scraping element and is cleaned by means of relative movement between the scraping element and the perforated plate, wherein the first or second deflection rail section comprises a first upper deflection wheel, a second central deflection wheel that deflects the plates upwards from a first horizontal movement direction to the first upper deflection wheel, and a third lower deflection wheel to which the plates are deflected by the first upper deflection wheel and which defects the plates in t a second horizontal movement direction that is opposite to the first horizontal movement direction, and wherein the scraping element is pivotably mounted around the rotational axis of the central deflection wheel.

2. The drying device according to claim 1, wherein the perforated plates of the first majority of perforated plates are connected with each other or with a carrier to form a conveying surface.

3. The drying device according to claim 1, wherein the scraping element is flexibly guided relative to the first conveyor.

4. The drying device according to claim 1, wherein the scraper device comprises a pivot bearing on which the scraping element is mounted pivotably around a pivot axis relative to the first conveyor.

5. The drying device according to claim 4, wherein the pivot axis is positioned coaxially to a deflection axis of a deflection roll on which the perforated plates are deflected.

6. The drying device according to claim 1, wherein the scraping element is an elastic scraping lip.

7. The drying device according to claim 6, wherein the scraping element is a rubber-elastic scraping lip.

8. The drying device according to claim 1, wherein the scraping element is in contact with the perforated plates in an area in which the location surfaces of the perforated plates are inclined to the horizontal.

9. The drying device according to claim 8, wherein the scraping element is in contact with the perforated plates in an area in which the location surfaces of the perforated plates are inclined to the horizontal at an angle of more than 45° to the horizontal.

10. The drying device according to claim 8, wherein the scraping element is in contact with the perforated plates in an area in which the location surfaces of the perforated plates are arranged substantially perpendicularly to the horizontal.

11. The drying device according to claim 1, wherein the first majority of perforated plates is guided along the upper and lower rail sections with the location surfaces in a substantially horizontal orientation, and pivoted within the area of the first deflection section from the horizontal orientation in at least a part of the deflection rail section.

12. The drying device according to claim 1, wherein the perforated plates of the first majority of perforated plates entering from the upper rail section into the first deflection rail section are pivoted from a substantially horizontal orientation to an inclined orientation of the location surfaces proximate the first deflection rail section in a first part of the deflection rail section, and that perforated plates are arranged below the first part of the deflection rail section whose location surfaces are aligned substantially horizontally.

13. The drying device according to claim 12, wherein the perforated plates arranged below the part of the first deflection rail section are part of the first majority of perforated plates.

14. The drying device according to claim 1, further comprising:

a lower conveyor, on which a second majority of perforated plates is guided along an upper rail section of the lower conveyor, a lower rail section of the lower conveyor, and the first deflection rail section at the end, in which the perforated plates are deflected from the upper into the lower rail section of the lower conveyor, and the second deflection rail section at the opposite end in which the perforated plates are deflected from the lower rail section of the lower conveyor into the upper rail section of the lower conveyor;

wherein the lower rail section of the lower conveyor runs below the first conveyor within the first deflection rail section, and wherein the bulk material, which, in the first deflection rail section, slips from the location surface of a perforated plate of the second majority of perforated plates as the location surface is tilted, and falls onto another perforated plate of the second majority of perforated plates on the lower rail section of the lower conveyor.

15. The drying device according to claim 14, wherein the perforated plates of the first majority of perforated plates that enter from the lower rail section of the first conveyor into the second deflection rail section are pivoted from a substantially horizontal orientation of the location surfaces proximate the second deflection rail section in a first part of the second deflection rail section, and that perforated plates of the second majority of perforated plates are arranged below the first part of the second deflection rail section whose location surfaces are substantially horizontally aligned.

16. A drying device for bulk material, comprising:

a first conveyor on which a first majority of perforated plates with location surfaces for the bulk material is guided along a rail comprising an upper rail section, a lower rail section and a first deflection rail section at the end, in which the perforated plates are deflected from the upper into the lower rail section, and a second deflection rail section at an opposite end in which the perforated plates are deflected from the lower rail section into the upper rail section;

a deflection wheel that deflects the plates from the upper rail section to the lower rail section; and a scraper device arranged proximate the first or second deflection rail section comprising a scraping element that is arranged in such a way that the location surface of a perforated plate moving along the first or second deflection rail section comes into contact with the scraping element and is cleaned by means of relative movement between the scraping element and the perforated plate, wherein the scraping element is pivotably mounted around the rotational axis of the deflection wheel.

* * * * *

UNITED STATES PATENT AND TRADEMARK OFFICE

CERTIFICATE OF CORRECTION

PATENT NO. : 9,291,392 B2
APPLICATION NO. : 14/075045
DATED : March 22, 2016
INVENTOR(S) : Themann It is certified that error appears in the above-identified patent and that said Letters Patent is hereby corrected as shown below:

In the Specification

Col. 10, line 26, "1101" should be --110/--

Col. 10, line 52, "1101" should be --110/--

In the Claims

Col. 11, claim 1, line 45, "defects" should be --deflects--

Col. 11, claim 1, line 45, delete "t"

Col. 12, claim 12, line 26, "that" should be --the--

Col. 12, claim 14, line 39, after "upper" insert --rail section--

Col. 12, claim 15, line 60, "that" should be --the--

Col. 13, claim 16, line 3, after "upper" insert --rail section--

Signed and Sealed this
Seventh Day of June, 2016

Michelle K. Lee
*Director of the United States Patent and Trademark Office*